US007646390B2

(12) United States Patent
Yokoyama

(10) Patent No.: US 7,646,390 B2
(45) Date of Patent: Jan. 12, 2010

(54) DISPLAY AND DISPLAY SYSTEM

(75) Inventor: Toshihiko Yokoyama, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 483 days.

(21) Appl. No.: 11/152,003

(22) Filed: Jun. 14, 2005

(65) Prior Publication Data

US 2005/0275649 A1 Dec. 15, 2005

(30) Foreign Application Priority Data

Jun. 15, 2004 (JP) ............................. 2004-177180

(51) Int. Cl.
*G06T 15/00* (2006.01)

(52) U.S. Cl. ....................... 345/589; 348/603; 250/221; 382/202

(58) Field of Classification Search ................. 345/589; 348/603; 250/221; 382/202
See application file for complete search history.

(56) References Cited

U.S. PATENT DOCUMENTS

| | | | | |
|---|---|---|---|---|
| 6,292,228 | B1 * | 9/2001 | Cho | 348/603 |
| 6,727,489 | B2 * | 4/2004 | Yano | 250/221 |
| 6,876,766 | B2 * | 4/2005 | Gorbatov et al. | 382/202 |
| 2003/0080985 | A1 | 5/2003 | Kagawa | |

FOREIGN PATENT DOCUMENTS

| | | |
|---|---|---|
| JP | 2003-131641 A | 5/2003 |

* cited by examiner

*Primary Examiner*—Phu K Nguyen
(74) *Attorney, Agent, or Firm*—Canon U.S.A. Inc., I.P. Division

(57) ABSTRACT

A display for displaying an image on the basis of input image data includes an image adjusting unit configured to perform adjustment processing on the input image data and an image detecting unit configured to detect a first image data segment matching a predetermined condition in the input image data. The image detecting unit performs the adjustment processing on the basis of the first image data segment.

11 Claims, 9 Drawing Sheets

FIG. 3
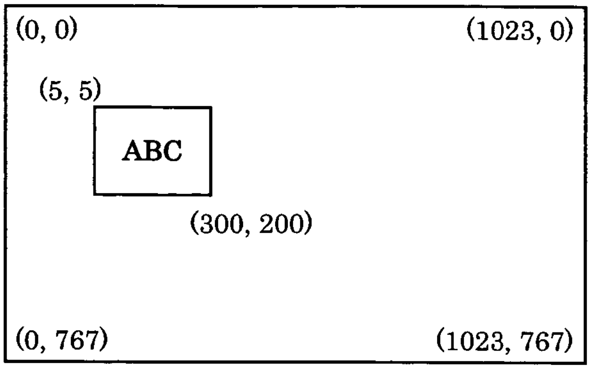
FIG. 4
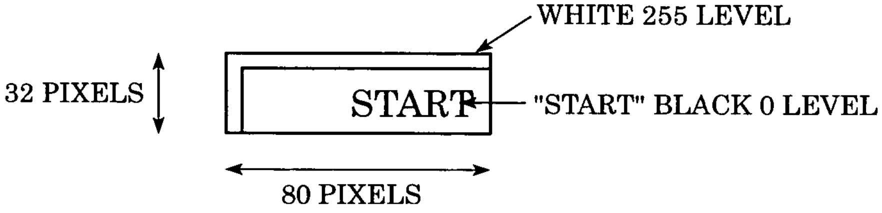
FIG. 5A
FIG. 5B
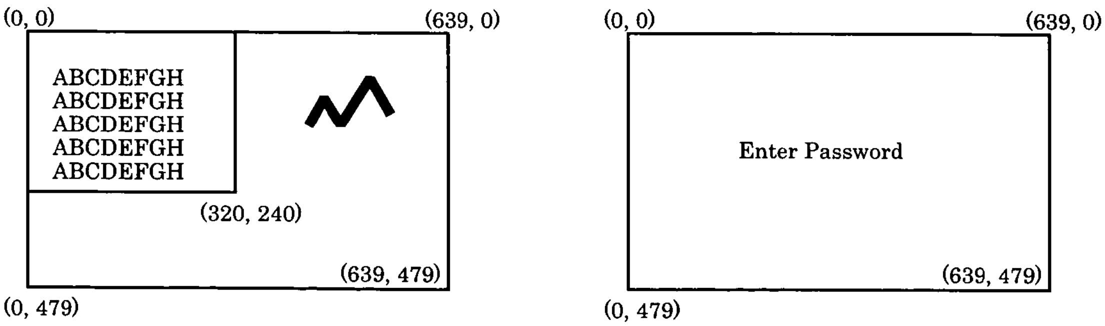

FIG. 6A

| | IMAGE DETECTION CONDITION | | | | ACTIVATION CONDITION |
|---|---|---|---|---|---|
| | INPUT RESOLUTION | FRAME RATE | TARGET IMAGE AREA | SPECIFIC IMAGE | ACTIVATION CONDITION |
| 1 | NONE | NONE | NONE | NONE | IMAGE DETECTION CONDITION MATCH |
| 2 | 640×480 | 60Hz | ALL | START ICON IN LOWER LEFT CORNER | A/D ADJUSTMENT MODE |
| 3 | 1024×768 | 70Hz | (0, 0) (1024, 768) | START ICON IN LOWER RIGHT CORNER | NON-DISPLAY STATE |
| 4 | 1280×1024 | 75Hz | | START ICON IN UPPER LEFT CORNER | PICTURE MUTE MODE |
| 5 | 1600×1200 | 80Hz | | START ICON IN UPPER RIGHT CORNER | UPON BOOT-UP OF DISPLAY |

FIG. 6B

| CONDITION NUMBER | NAME | INPUT RESOLUTION | FRAME RATE | TARGET IMAGE AREA | SPECIFIC IMAGE | ACTIVATION CONDITION |
|---|---|---|---|---|---|---|
| 1 | Bios 1 | 640×480 | 60Hz | (0, 0) (320, 240) | NONE | IMAGE DETECTION CONDITION MATCHING |
| 2 | Bios 2 | 640×480 | 60Hz | ALL | NONE | A/D ADJUSTMENT MODE |
| 3 | START 1 | 1024×768 | 60Hz | (0, 735) (80, 767) | START ICON IN LOWER LEFT CORNER | NON-DISPLAY STATE |
| 4 | START 2 | 1024×768 | 60Hz | | START ICON IN UPPER RIGHT CORNER | PICTURE MUTE MODE |
| 5 | START 3 | 1024×768 | 60Hz | | START ICON IN UPPER RIGHT CORNER | UPON BOOT-UP OF DISPLAY |

DISPLAY AND DISPLAY SYSTEM

BACKGROUND OF THE INVENTION

1. Field of the Invention

The present invention relates to a display for displaying an image after converting an analog video signal to a digital signal.

2. Description of the Related Art

Apparatuses for displaying images, such as liquid crystal displays (LCDs) and LCD projectors, are connected to devices for generating image data, such as personal computers (PCs). Since signals output to the display apparatuses are generally analog red, green, and blue (RGB) signals, output levels of image data are different from one device to another. In other words, signal levels of image data output to the display apparatuses have variations. This makes it difficult to display a high quality image.

Japanese Patent Laid-Open No. 2003-131641 (in particular, paragraphs 54 to 66 and FIG. 1, corresponding to paragraphs 62 to 74 and FIG. 1 of U.S. application Publication No. 2003-0080985) discloses an image display system having automatic image adjustment capability. The system is described below with reference to FIG. 10.

FIG. 10 is a block diagram showing a method for adjusting an image in a conventional image display system, as mentioned above.

An image display device 101*b* includes a display unit 104, an analog-to-digital (A/D) converter 105, an automatic level adjuster 106*b*, and an adjusting-image data output instruction signal generator 109. An image data generation device 102*b* includes an image data sender 107*b*, a general image data generator 110, and an adjusting-image data generator 111.

A transmission unit 103*b* transmits an adjusting-image data output instruction signal and an adjusting-image data output completion signal for communication control and an analog image signal between the image display device 101*b* and the image data generation device 102*b*.

In an automatic image adjustment process, an adjusting-image data output instruction signal is sent to the image data generation device 102*b*, and the image data generation device 102*b* sends adjusting image data together with an adjusting-image data output completion signal to the image display device 101*b*. Using the adjusting image data, the image display device 101*b* performs automatic level adjustment.

However, the image display system disclosed in Japanese Patent Laid-Open No. 2003-131641 has the following problems:

(1) In addition to an analog image data signal, an adjusting-image data output instruction signal and adjusting-image data output completion signal for communication control are required.

(2) In order to forcibly set an image suitable for automatic level adjustment, it is necessary to have communicating means for sending an adjusting-image data output instruction signal from the image display device 101*b* to the image data generation device 102*b*.

(3) In order to make sure that the image data generation device 102*b* outputs an adjusting image after receiving an adjusting-image output instruction signal, it is necessary that an adjusting-image output completion signal be sent to the image display device 101*b*.

(4) In addition to a signal line for analog RGB image signals, a signal line for communication control (e.g., a universal serial bus (USB) cable or Recommended Standard 232C (RS-232C) cable) is required. This is disadvantageous in terms of costs and cable connections. Also, it is necessary to create an image dedicated to image adjustment in the image data generation device 102*b*, and therefore, it is impossible to individually perform adjustment in different image data generation devices.

SUMMARY OF THE INVENTION

The present invention provides a display and a display system capable of readily performing image adjustment.

According to one aspect of the present invention, a display for displaying an image on the basis of input image data includes an image adjusting unit and an image detecting unit. The image adjusting unit is configured to perform adjustment processing on a displayed image on the basis of the input image data. The image detecting unit is configured to detect a first image data segment matching a predetermined detection condition in the input image data. The image adjusting unit performs the adjustment processing on the basis of the first image data segment.

The display and the display system according to the present invention can readily perform suitable image adjustment on a displayed image on the basis of a first image data segment matching a predetermined condition, so that the display and the display system can display a high quality image.

Further features and advantages of the present invention will become apparent from the following description of exemplary embodiments with reference to the attached drawings.

BRIEF DESCRIPTION OF THE DRAWINGS

FIG. 3 shows a target image area according to the first embodiment.

FIG. 4 shows a specific image according to the first embodiment.

FIGS. 5A and 5B show target image areas according to the first embodiment.

FIGS. 6A and 6B are tables showing examples of image detection conditions and activation conditions according to the first embodiment.

DESCRIPTION OF THE EMBODIMENTS

The embodiments of the present invention are described below with reference to the drawings.

First Embodiment

Figure 1:
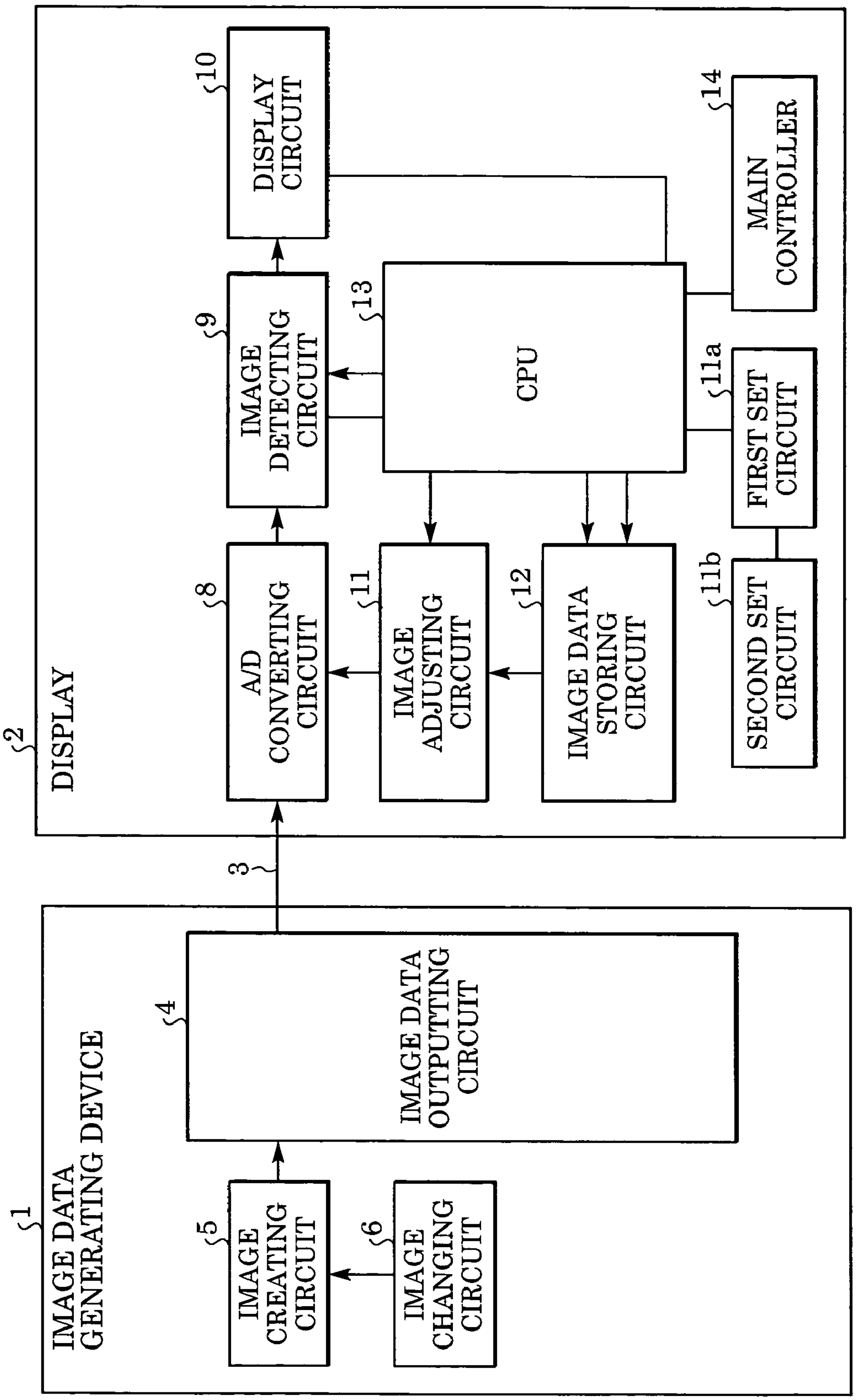
FIG. 1 is a block diagram of a display system according to a first embodiment of the present invention.

FIG. 1 is a block diagram of a display system according to a first embodiment of the present invention. The display system includes an image data generating device 1, such as a personal computer (PC), a display 2, and a communication link, e.g., a transmission cable 3, between the image data generating device 1 and the display 2. Examples of the display 2 include a liquid crystal display (LCD) and a LCD projector.

The image data generating device 1 includes an image data outputting circuit 4, an image creating circuit 5, and an image changing circuit 6. The image changing circuit 6 is for changing a resolution of an image to be output, a frame rate, and/or the position of a taskbar. The resolution of an image is suitably changed by the image changing circuit 6, and the image is output to the display 2 by the image data outputting circuit 4.

The image creating circuit 5 can create image data in a normally operating state. The image data may be, for example, a desktop screen in an operating system, or a screen in various application software programs.

The display 2 includes an analog-to-digital (A/D) converting circuit 8 for converting analog image data transmitted from the image data generating device 1 into digital data, an image detecting circuit 9 for detecting image data matching a predetermined detection condition, a display circuit (unit) 10 for displaying image data, an image adjusting circuit 11 for adjusting the brightness level of a displayed image by adjusting a minimum level and maximum level in converting analog image data to digital image data, an image data storing circuit 12 for storing image data for adjustment, a control circuit (CPU) 13, and a main controller 14.

The transmission cable 3 is for transmitting analog RGB video signals between the image data generating device 1 and the display 2. The transmission cable 3 may not be a cable component, and it may be, for example, a structure capable of performing wireless communication. The transmission cable 3 may be any other component as long as analog RGB video signals can be transmitted from the image data generating device 1 to the display 2.

The image detecting circuit 9 can extract an area of an image for adjustment from an image in part or in entirety. The image detecting circuit 9 can determine whether a displayed image matches the image data for adjustment to detect an image for adjustment. This image detection processing is realized by image recognition processing (e.g., pattern matching) or by the determination of matching for a detection condition for resolution or a frame rate of an input signal.

The image detecting circuit 9 can determine whether or not to perform the image detection processing using an activation condition for image detection processing regarding a state of the display 2. Examples of the activation condition include a time when a displayed image matches the image data for adjustment, a time when power is turned on, a time when the display 2 is in picture mute mode, and a time when the input is switched. If the state of the display 2 is determined to match the activation condition, the image detection processing is activated such that the state is determined to match image data for adjustment. Therefore, the image adjustment processing is performed when both the activation and image detection conditions (AND) are satisfied.

The image adjusting circuit 11 can automatically adjust an image signal transmitted from the image data generating device 1 to the display 2 such that analog level and digital level coincide with each other in A/D conversion. This operation is described below.

The image adjusting circuit 11 performs automatic adjustment of the brightness level of a displayed image by adjusting the minimum level and the maximum level in A/D conversion, in which analog image data from the image data generating device 1 is converted to digital image data. For example, in 8-bit A/D conversion, the digital image data has a minimum level of zero and a maximum level of 255.

On the other hand, the level of an analog signal of analog image data is represented by an analog voltage, and usually, it exhibits a minimum value of 0 V for black-signal level of output from the image data generating device 1 and a maximum value of 0.7 V for white-signal level. However, general image generating devices have an error of −1% to +5% for a specification of 0.7 V.

Therefore, the image adjusting circuit 11 performs automatic adjustment such that the minimum and maximum levels of an analog voltage including individual differences of the image data generating device 1 correspond to “0” and “255”, respectively, in the A/D converting circuit 8.

For example, the minimum level is adjusted by offset adjustment, and the maximum level is adjusted by gain adjustment.

For such offset adjustment, the offset voltage of a signal input to the A/D converting circuit 8 is adjusted. For such gain adjustment, the reference voltage used in the A/D converting circuit 8 is adjusted. As an alternative to this, adjusting the digital value output from the A/D converting circuit 8 by computation may be used. For the offset adjustment, the digital output value is subjected to an addition or subtraction, for example. For the gain adjustment, the digital output value is subjected to a multiplication, for example.

If automatic level adjustment is insufficient, an image quality is degraded. For example, if an input of A/D conversion is too small with respect to the maximum value of analog image data, gradations of the portions with high brightness in an image appearing on the display unit 10 are eliminated, i.e., the image with the portions is filled with white. If it is too large with respect to the minimum value of analog image data, an image appearing on the display unit 10 has reduced brightness and low contrast.

The image adjusting circuit 11 typically uses a technique employing a frequency distribution of an image signal (histogram). The image adjusting circuit 11 monitors the level of the digital image data after the A/D conversion and detects the maximum and minimum values of occurrence of the digital image data within a fixed time period. Specifically, the image adjusting circuit 11 performs adjustment such that an analog signal detected as the maximum value corresponds to “255”, in and after the A/D converting circuit 8, and an analog signal detected as the minimum value corresponds to “0” in and after the A/D converting circuit 8.

In this embodiment, any image suitable for adjustment including a white component, or a “255” signal, and a black component, or a “0” signal, is a target for automatic adjustment. In order to avoid error detection more reliably, an image consisting of black and white components is desirable.

The display 2 according to this embodiment includes a first set circuit 11*a* and a second set circuit 11*b* used for automatic level adjustment. Through these circuits, a user sets a condition for image data for adjustment in advance and also sets a condition regarding a timing for performing the adjustment processing using an on-screen menu system contained in the display 2 or the like in order to perform the automatic level adjustment of the display 2. As described below, the first set circuit 11*a* is used for setting an image for adjustment, a target image area, a corresponding resolution, a frame rate, and a specific image through an on-screen menu in the display 2, and the second set circuit 11*b* is used for setting an activation condition.

Figure 2:
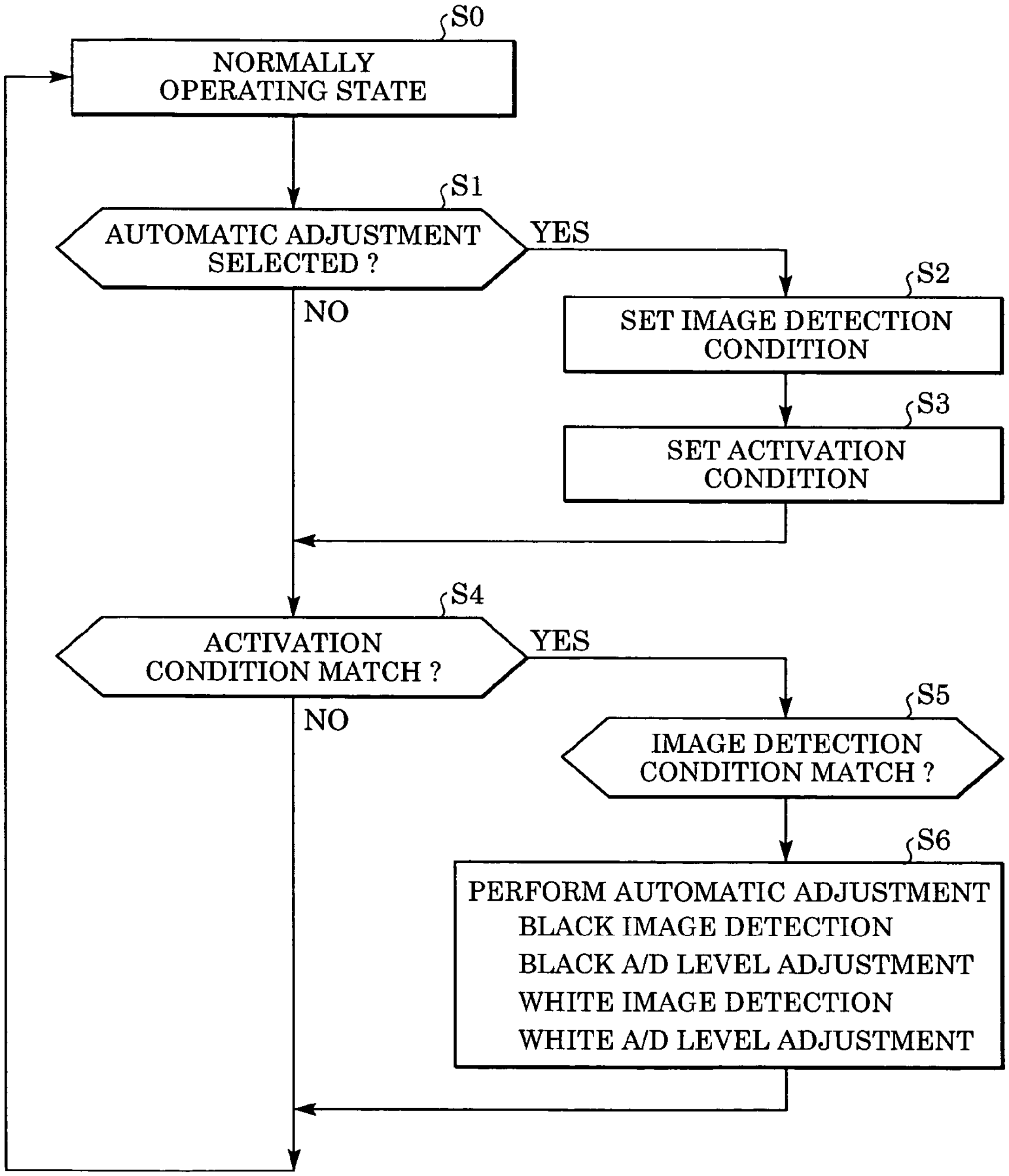
FIG. 2 is a flowchart of the operation of a display according to the first embodiment.

The operation of a display system according to this embodiment is described below. FIG. 2 is a flowchart of the operation of the display 2. The operation of the display system described below is one example in which each processing and each operational step of circuits are stored as programs in the main controller 14 in advance, the programs are sequentially read by the CPU 13, and each operation of processing is controlled.

When the display 2 is in a normally operating state (step S0), a user selects through an on-screen menu whether or not to perform automatic image adjustment (step S1). If the automatic image adjustment is selected, the processing moves to step S2, where an image detection condition is set. In step S2, the image detection condition of an image suitable for adjustment selected from images in the image data generating device 1 is set. For example, when a basic input output system (BIOS) screen is used for adjustment, an input resolution of 640 by 480 pixels, a frame rate of 60 Hz, a target image area of all area, and the like are set with the first set circuit 11*a*.

The processing then moves to step S3, where an activation condition is set. In step S3, as the activation condition, for example, a case in which a displayed image matches the image detection condition is set with the second set circuit 11*b*. The image data is then stored in the image data storing circuit 12, and the processing of step S3 is completed.

After the setting operation described above is finished, the display 2 returns to a state equal to its normally operating state, but the display 2 monitors whether its state matches the set automatic adjustment conditions (activation and image detection conditions). If the image matches the activation condition for image adjustment processing (YES in step S4), the state is determined to match the image detection condition (step S5). If the image condition matches, for-example, an input resolution of 640 by 480 pixels and a frame rate of 60 Hz, the processing moves to automatic image adjustment processing (step S6).

Under the conditions mentioned above, for example, the automatic image adjustment processing is performed such that black and white portions of characters and their adjacent area of a BIOS screen output at startup of the image data generating device 1 are automatically detected using a technique employing frequency distribution of the image (histogram). Specifically, the offset voltage of an analog signal is adjusted such that analog image data with the minimum value is regarded as a black component and its converted digital image data in the A/D converting circuit 8 becomes "0". Similarly, the reference voltage of the A/D converting circuit 8 is adjusted such that analog image data with the maximum value is regarded as a white component and its converted digital image data in the A/D converting circuit 8 becomes "255".

After the automatic image adjustment is completed, the display 2 returns to its normally operating state (step S0) and monitors whether its state matches the activation condition for the automatic image adjustment (step S4) as described above.

FIGS. 5A and 5B show examples of the BIOS screen. Since the BIOS screen shown in FIG. 5A has a black-and-white portion of characters and their adjacent area in the left part. If coordinates of (0, 0) for the upper left corner of a selected image area and coordinates of (320, 240) for the lower right corner are specified, a black signal and a white signal can be detected reliably. In the case of the screen shown in FIG. 5B, it is possible to set all screen area as a target image area.

If the coordinates are not specified and the entire screen area is set as a target image area, only an image segment analogous to a black-and-white image is detected and adjusted, so that a black-and-white area can be easily detected.

The image detection condition and activation condition for automatic adjustment are described below with reference to FIGS. 6A and 6B.

The setting conditions are broadly divided into the image detection condition and the activation condition. Examples of the image detection condition include an input resolution, a frame rate, a target image area setting, and a specific image setting. Examples of the specifications of the input resolution include "none", "640×480", "1024×768", "1280×1024", and "1600×1200". Examples of the specifications of the frame rate include "none", "60 Hz", "70 Hz", "75 Hz", and "80 Hz".

Examples of the target image area setting include "none", "all", and "(x1, y1), (x2, y2)", which are coordinates for the upper left corner and those for lower right corner, respectively. Setting the coordinates allows the image detection to be focused on a portion of the screen. For the example shown in FIG. 3, in order to focus on an area where letters "ABC" are present, (5, 5) and (300, 200) can be set as the target image area.

For the specific image setting, a Start icon displayed in a taskbar on a desktop screen can be used as an image for automatic adjustment.

As shown in FIG. 4, this icon has a size of 80 by 32 pixels. In this icon, a black signal is used for "START", and a line on the top of a box exhibits white level.

Examples of the specific image settings include "none", "Start icon in lower left corner", "Start icon in lower right corner", "Start icon in upper left corner", and "Start icon in upper right corner".

The activation condition is based on the premise that automatic image adjustment processing is activated depending on a state of the display 2. Examples include a case in which "A/D adjustment mode" is selected through an on-screen menu in the display 2, a case in which an image is not displayed on the display 2, a case in which the display 2 is in "picture mute mode", which displays a black image, and a time when power is turned on to the display 2.

These conditions regarding image data can be freely and individually set so as to match an image suitable for the image data generating device 1 that a user has. An example of the operation of setting individual conditions is described below with reference to FIG. 6B.

For example, Condition No. 1 indicates a case in which the BIOS screen shown in FIG. 5A is set as an image for automatic adjustment. Condition No. 1 is named "Bios 1", and an image with a resolution of 640 by 480 and a frame rate of 60 Hz is set. The coordinates (0, 0) and (320, 240) are set as the target image area in order to set an area including characters present in the left side. As the specific image setting, "none" is set, because Start icon is not intended to be used. As the activation condition, in order to automatically perform adjustment processing at the startup of the image data generating device 1, a case in which a displayed image matches the image detection condition is set. In this case, the activation condition is satisfied when the image detection condition is satisfied, and the determination processing of the activation condition directly links to the determination processing of the image detection condition. Therefore, the determination processing of the activation condition leads to automatic image adjustment processing.

As a result, if such a condition is set, adjustment processing is automatically performed every time the image data generating device 1 is started up, and therefore, the display 2 is adjusted such that the gradations having optimal white and black levels are realized. Setting an image for automatic adjustment so as to have a pattern that is easy to recognize prevents a malfunction from occurring in image recognition.

A case in which "Start icon" is set as an image for automatic adjustment is described below. In FIG. 6B, Condition No. 3 is named "START 1". In Condition No. 3, an image with a resolution of 1024 by 768 pixels and a frame rate of 60 Hz. The coordinates (0, 735) and (80, 767) are set as the target image area in order to set an area in the lower left corner. As the specific image setting, “Start icon in lower left corner” is set. As the activation condition, “picture mute mode” is set. These settings make it possible to automatically perform adjustment processing every time the display 2 is switched to picture mute mode such that “Start icon” is automatically recognized, and therefore, the display 2 is adjusted such that the gradations having optimal white and black levels are realized.

As described above, in this embodiment, a resolution and a frame rate in the image data generating device 1, an area of an image, and a specified image are stored (set) in the display 2 in advance. In addition, as a condition for shifting to adjustment mode, a time when a displayed image matches the image detection condition, a time when power is turned on to the display 2, a time when the display 2 is turned in picture mute mode, a time when the input is switched, and a time when adjustment mode is selected on an on-screen menu are stored in the image data storing circuit 12.

As a result, the display 2 automatically detects a displayed image matching the stored image data for adjustment in accordance with a resolution, a display mode, and image detection. Then, when the display 2 is determined to be able to shift to image adjustment processing mode, the image adjusting circuit 11 performs level adjustment on the basis of the image data for adjustment.

Therefore, since the level of an analog RGB video signal is automatically adjusted by selecting an image for adjustment from common images displayed on the image data generating device 1 and by automatically recognizing an image pattern, it is not necessary to provide instructions to send image data and to perform acknowledgement, such as a completion signal. Therefore, it is not necessary to have a cable for control, in addition to a cable for analog RGB video signals.

As a result, even when output levels of image data are different from one device to another, a high quality image is automatically displayed without performing setting with respect to individual devices. Once a user has performed setting, substantially automatic image adjustment will be performed on a display and a display system when necessary.

Second Embodiment

The second embodiment is described below. In the first embodiment, a user sets and stores a predetermined image and a condition in the display 2 in order to perform automatic level adjustment. In the second embodiment, the display 2 performs automatic level adjustment by recognition on the basis of image data for adjustment created by the image data generating device 1.

Figure 7:
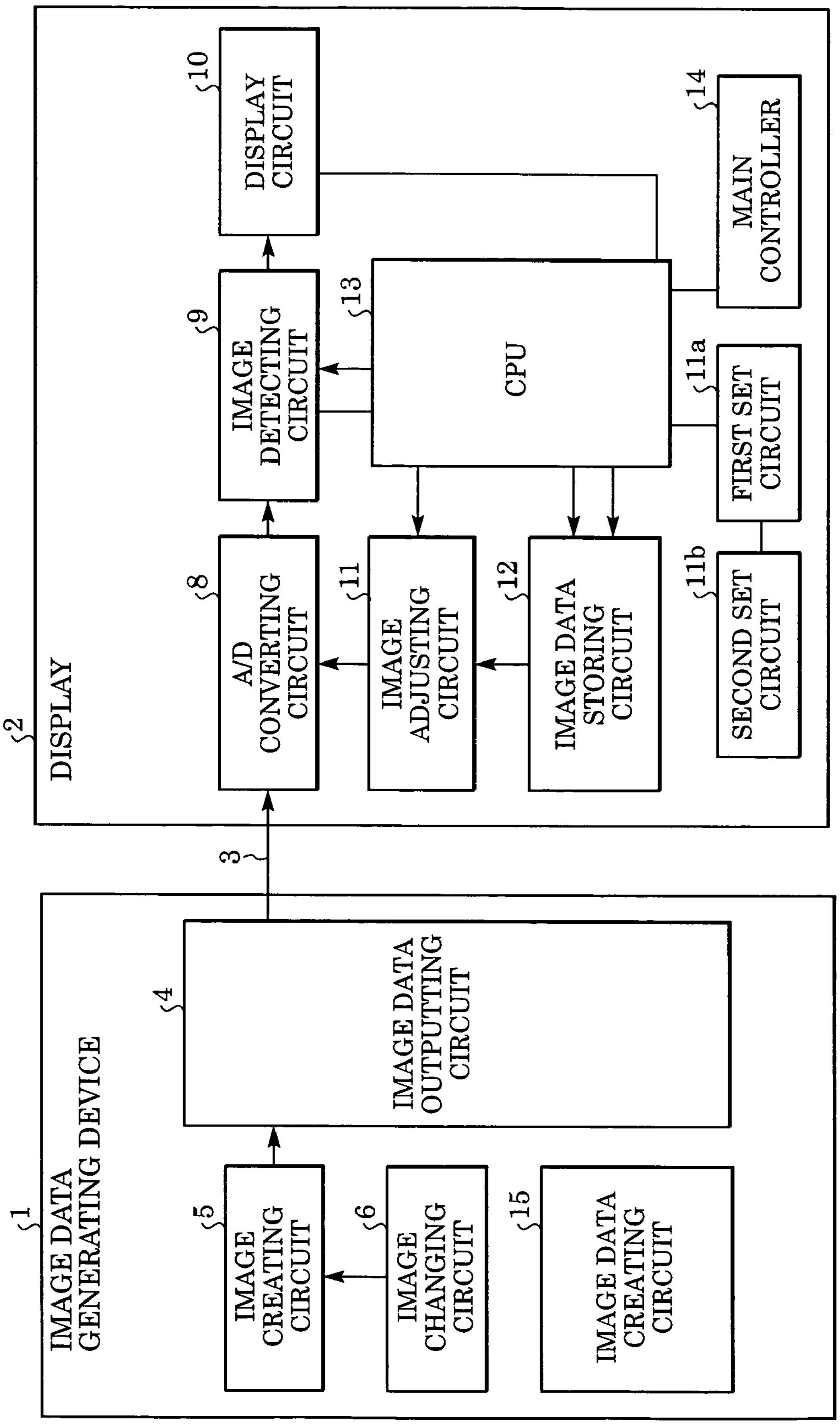
FIG. 7 is a block diagram showing the display system according to a second embodiment.

FIG. 7 is a block diagram showing a display system according to the second embodiment. FIG. 7 shows the structure in which an image data creating circuit 15 for creating image data for adjustment is added to the image data generating device 1 in the display system shown in FIG. 1. Other components in the image data generating device 1 and the display 2 shown in FIG. 7 are the same as those in FIG. 1. Therefore, the explanation thereof is not repeated here.

Figure 8:
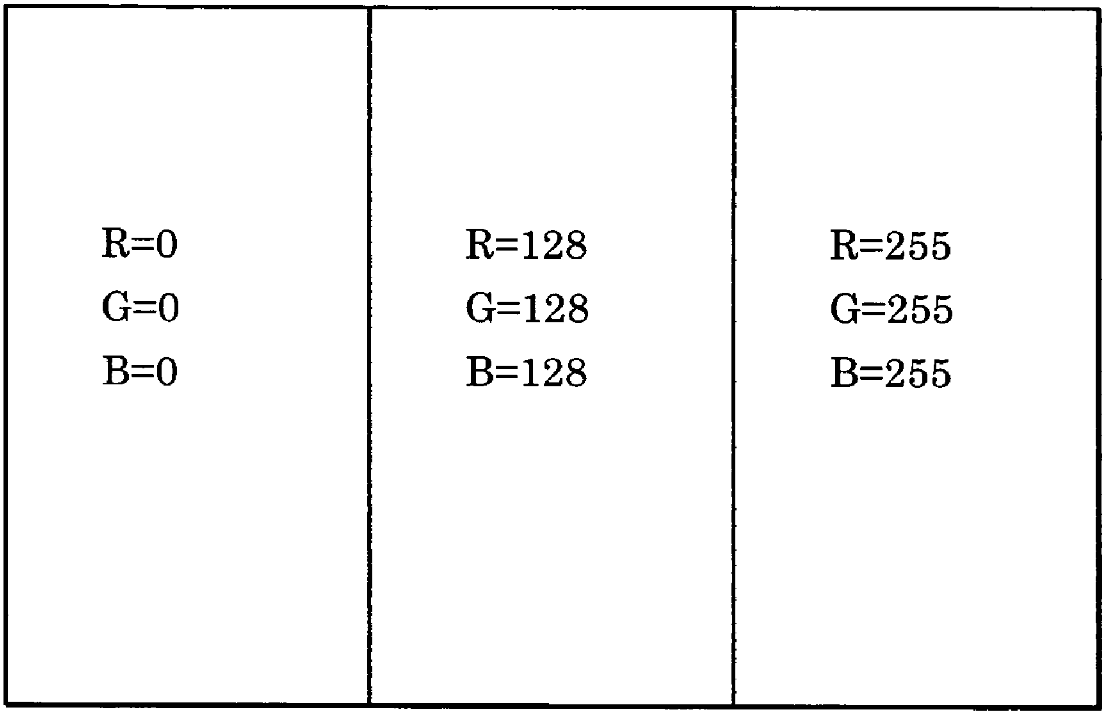
FIG. 8 shows image data for adjustment according to the second embodiment.

In this embodiment, image data for adjustment shown in FIG. 8 is created by the image data creating circuit 15. The image data for adjustment is displayed on the image data generating device 1 and output to the display 2, so that the display 2 automatically recognizes an image for adjustment and performs automatic image adjustment. The operation of the display system according to this embodiment is described below with reference to FIGS. 9A and 9B.

Figure 9A:
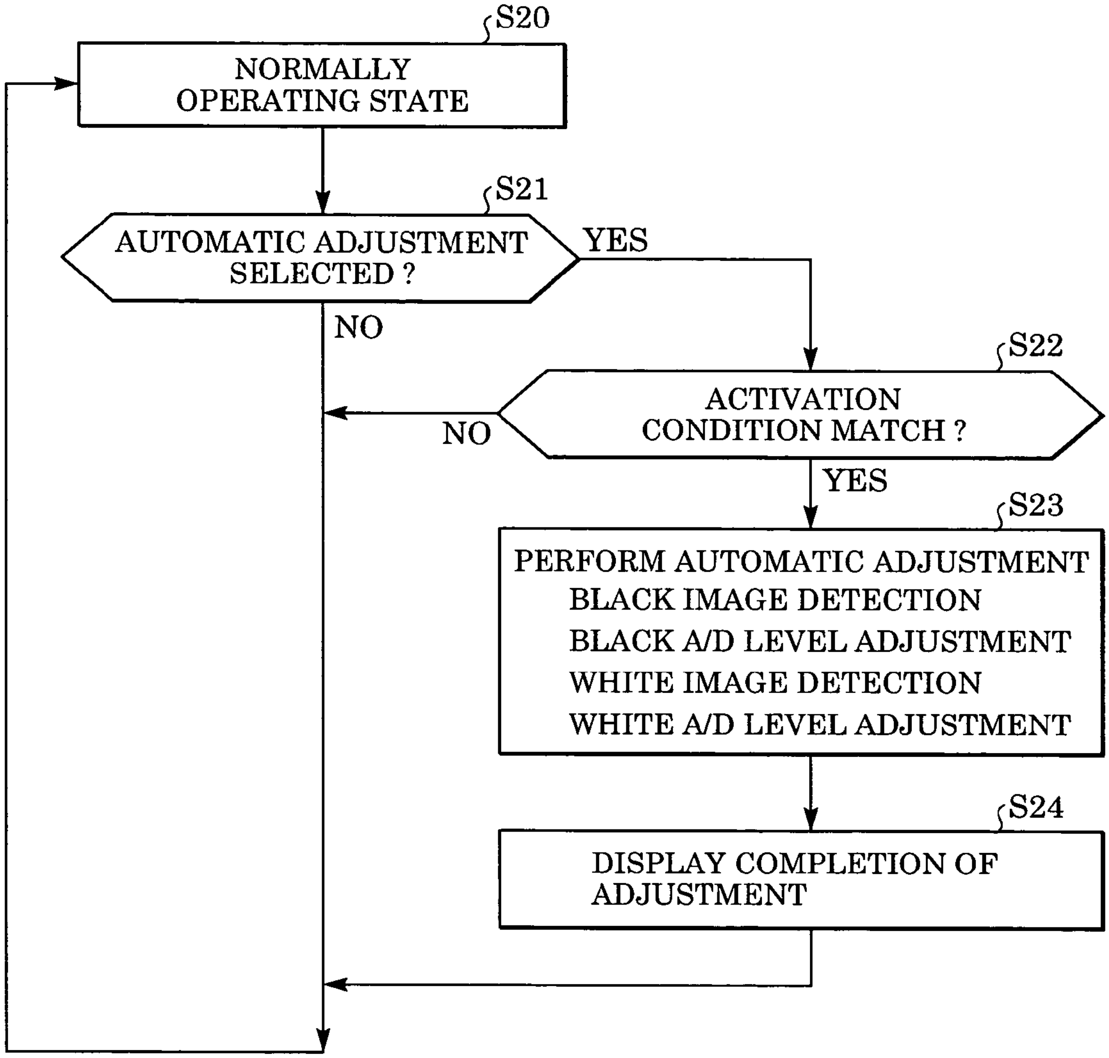
FIGS. 9A and 9B are flowcharts of the display system according to the second embodiment.

The operation of the display 2 is described below (see FIG. 9A).

When the display 2 is in a normally operating state (step S20), a user selects whether or not to perform automatic level adjustment (step S21) through an on-screen menu. If the automatic image adjustment is selected, the processing moves to step S22, where image detection processing is performed by the image detecting circuit 9. As is the case with the first embodiment, a pattern of an input image is regularly detected so that the image is determined to match a predetermined image. The image recognition processing can use a general technique, as with the first embodiment. Examples of such a technique include a technique using a frequency distribution of an image signal (histogram), a technique using a chrominance signal, and a method of extracting an outline of an image. The image pattern is limited to that shown in FIG. 8, thus insuring accuracy. If the activation condition matches (YES in step S22), the processing moves to automatic image adjustment processing (step S23). Automatic adjustment processing is described above with reference to the first embodiment (step S6 of FIG. 2). Then, in step S24, a display is provided indicating completion of the automatic adjustment processing.

Figure 9B:
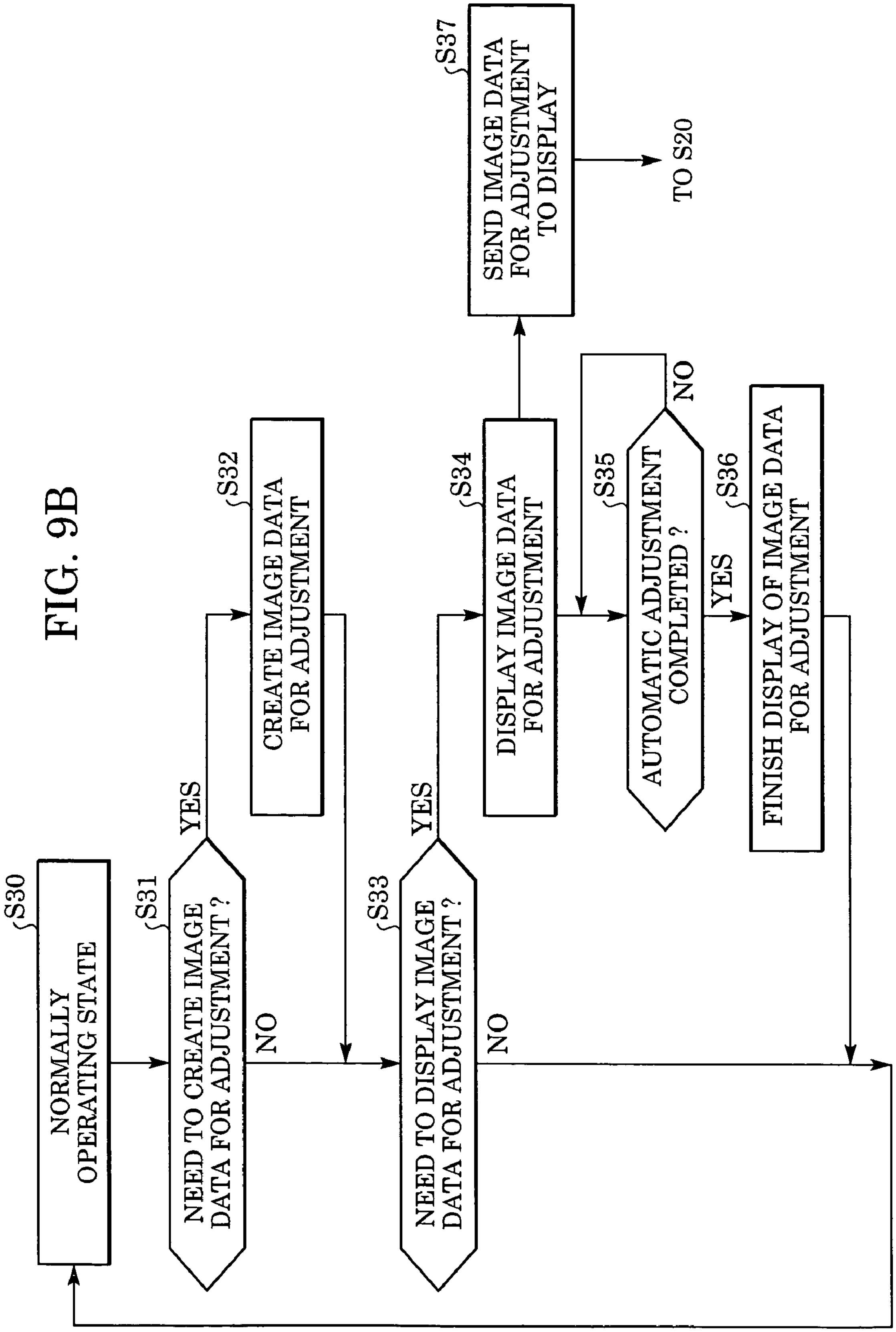
Figure 10:
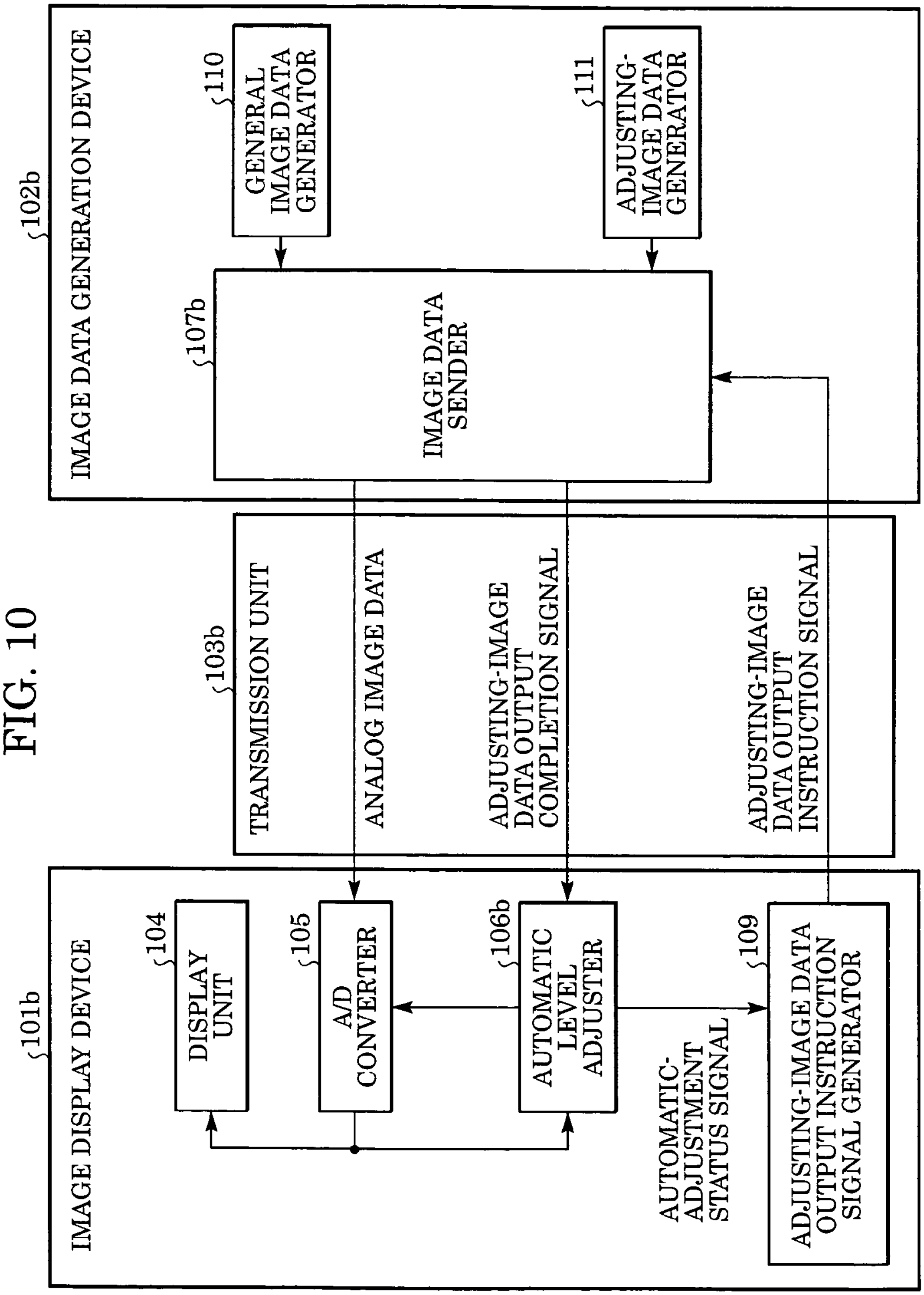
FIG. 10 is a block diagram showing a known display system.

The operation of the image data generating device 1 is described below with reference to FIG. 9B.

This operation is predicated on completion of the processing of a flowchart for the display 2. In a state in which automatic adjustment (performing image adjustment processing) is selected in the display 2, whether creation (installation) of image data for adjustment is selected (step S31). If creation is selected, the image data creating circuit 15 of the image data generating device 1 creates the image data for adjustment shown in FIG. 8 (step S32). The image data for adjustment may be created once (installed) for one image data generating device 1.

For automatic adjustment processing, whether the image data for adjustment is displayed on the image data generating device 1 is selected (step S33). If displaying is selected, the image data for adjustment is displayed on the image data generating device 1 (step S34) and the image data for adjustment shown in FIG. 8 is sent to the display 2 (step S37). Then, the image data generating device 1 waits until the image adjustment processing in the display 2 is completed (step S35).

Since the display 2 is in a state in which automatic adjustment (image adjustment processing) is selected, the display 2 receives the image data for adjustment sent from the image data generating device 1, automatically recognizes it, and at the same time, performs the image adjustment processing. When the image adjustment processing is completed, the indication of completion is displayed on a screen to inform a user of it. Then, the display 2 returns to its normally operating state.

After the user views the indication of completion of automatic adjustment on the screen of the display 2, the user selects the completion of the automatic adjustment in the image data generating device 1 (step S35) and finishes display of the image data for adjustment (step S36), and the image data generating device 1 returns to its normally operating state.

A plurality of image data generating devices may be used as the image data generating device 1 targeted for automatic adjustment. For example, if the plurality of image data generating devices are sequentially connected to the single display 2, the display 2 performs the processing of the flowchart shown in FIG. 9A and is turned into a state in which automatic adjustment (image adjustment processing) is selected, and the image data for adjustment is created in each of the image data generating devices targeted. Therefore, when the display 2 is connected to each of the image data generating devices, each of the image data generating devices performs the processing of steps S30 to S36 shown in FIG. 9B, as with the above case, thus realizing automatic adjustment with respect to the individual image data generating devices.

According to this embodiment, the image for adjustment is displayed on the image data generating device 1, and therefore, the display 2 automatically recognizes the image data for adjustment and automatically adjusts the level of an analog RGB video signal.

As a result, the image for adjustment can be set in the image data generating devices so as to have an image pattern that can be easily recognized, thus preventing a malfunction from occurring in image recognition.

The image data for adjustment is created (installed) in the image data generating devices targeted, and automatic adjustment is performed at least once every time each of the image data generating devices is connected to the display 2, so that the level is optimized at all times. Therefore, the setting for a high quality image without elimination of gradations in the portions having high brightness and without reduction in brightness and in contrast is realized.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-177180 filed Jun. 15, 2004, which is hereby incorporated by reference herein.

What is claimed is:

1. A display for displaying an image on the basis of input image data, the display comprising:

a storing unit configured to store an adjustment image data;

an image detecting unit configured to detect an image data segment matching the adjustment image data in the input image data;

an image adjusting unit configured to perform adjustment processing on a displayed image on the basis of the detected image data segment; and an A/D converting circuit configured to convert input analog image data into digital image data, wherein the adjustment processing in the image adjusting unit is a processing for adjusting a maximum value and a minimum value of a brightness level of the digital image data converted by the A/D circuit based on a maximum value and a minimum value of a brightness level of the detected image data segment.

2. The display according to claim 1, wherein the storing unit stores a plurality of different image data, the display further comprising a first setting unit configured to set the adjustment image data from the plurality of different image data.

3. The display according to claim 2, further comprising:

a second setting unit configured to set an activation condition for the adjustment processing performed by the image adjusting unit.

4. The display according to claim 3, wherein the activation condition includes at least one of a time when a mode of performing the adjustment processing is set, a time when a state in which an image is not displayed starts, a time when a state in which a black image is displayed starts, and a time when power is turned on to the display.

5. A display system comprising:

a display according to claim 1; and an image data generating device configured to input the image data to the display.

6. The display system according to claim 5, wherein the image data generating device includes an image data creating unit configured to create the adjustment image data.

7. A method for adjusting an image in a display for displaying an image on the basis of input image data, the method comprising:

a storing step of storing an adjustment image data;

a detecting step of detecting an image data segment matching the adjustment image data in the input image data;

an adjusting step of performing adjustment processing on a displayed image on the basis of the detected image data segment; and an A/D converting circuit step configured to convert input analog image data into digital image data, wherein the adjustment processing in the adjusting step is a processing for adjusting a maximum value and a minimum value of a brightness level of the digital image data converted by an A/D circuit in the A/D converting step based on a maximum value and a minimum value of a brightness level of the detected image data segment.

8. A computer storage device for storing a computer program for adjusting an image, the computer program making a computer section of a display for displaying an image on the basis of input image data execute:

a storing step of storing an adjustment image data;

a detecting step of detecting an image data segment matching the adjustment image data in the input image data;

an adjusting step of performing adjustment processing on a displayed image on the basis of the detected image data segment; and an A/D converting step configured to convert input analog image data into digital image data, wherein the adjustment processing in the adjusting step is a processing for adjusting a maximum value and a minimum value of a brightness level of the digital image data converted by an A/D circuit in the A/D converting step based on a maximum value and a minimum value of a brightness level of the detected image data segment.

9. A display for displaying an image based on input image data, the display comprising:

a storing unit configured to store adjustment image data;

an image detecting unit configured to detect an image data segment matching the adjustment image data in the input image data;

an image adjusting unit configured to perform adjustment processing on a displayed image based on the detected image data segment; and an A/D converting circuit configured to convert input analog image data into digital image data, wherein the adjustment processing in the image adjusting unit is a processing for matching a maximum value and a minimum value of the analog image data with a maximum value and a minimum value of a brightness level of the detected image data segment when the A/D converting circuit converts the analog image data into digital image data.

10. A method for adjusting an image in a display for displaying an image based on input image data, the method comprising:

a storing step of storing adjustment image data;

a detecting step of detecting an image data segment matching the adjustment image data in the input image data;

an adjusting step of performing adjustment processing on a displayed image based on the detected image data segment; and an A/D converting step configured to convert input analog image data into digital image data, wherein the adjustment processing in the image adjusting step is a processing for matching a maximum value and a minimum value of the analog image data with a maximum value and a minimum value of a brightness level of the detected image data segment when an A/D converting circuit converts the analog image data into digital image data in the A/D converting step.

11. A computer storage device for storing a computer program for adjusting an image, the computer program making a computer section of a display for displaying an image based on input image data execute:

a storing step of storing adjustment image data;

a detecting step of detecting an image data segment matching the adjustment image data in the input image data;

an adjusting step of performing adjustment processing on a displayed image based on the detected image data segment; and an A/D converting step configured to convert input analog image data into digital image data, wherein the adjustment processing in the image adjusting step is a processing for matching a maximum value and a minimum value of the analog image data with a maximum value and a minimum value of a brightness level of the detected image data segment when an A/D converting circuit converts the analog image data into digital image data in the A/D converting step.

* * * * *